(12) United States Patent
Ge et al.

(10) Patent No.: US 11,350,657 B2
(45) Date of Patent: Jun. 7, 2022

(54) PROTEIN GUMMY COMPOSITION

(71) Applicant: Pharmavite LLC, Northridge, CA (US)

(72) Inventors: Haiyan Ge, Valencia, CA (US); Edward Shneyvas, Westlake Village, CA (US)

(73) Assignee: PHARMAVITE, LLC, West Hills, CA (US)

(*) Notice: Subject to any disclaimer, the term of this patent is extended or adjusted under 35 U.S.C. 154(b) by 0 days.

(21) Appl. No.: 16/056,280

(22) Filed: Aug. 6, 2018

(65) Prior Publication Data
US 2020/0037653 A1   Feb. 6, 2020

(51) Int. Cl.
*A23L 29/281*   (2016.01)
*A23L 33/15*   (2016.01)

(52) U.S. Cl.
CPC ............ *A23L 33/15* (2016.08); *A23L 29/284* (2016.08); *A23V 2002/00* (2013.01); *A23V 2200/204* (2013.01); *A23V 2250/154* (2013.01); *A23V 2250/54252* (2013.01); *A23V 2250/628* (2013.01); *A23V 2250/6416* (2013.01); *A23V 2250/706* (2013.01)

(58) Field of Classification Search
None
See application file for complete search history.

(56) References Cited

U.S. PATENT DOCUMENTS

| | | | |
|---|---|---|---|
| 3,728,128 A | 4/1973 | Luksas | |
| 5,766,636 A | 6/1998 | Turk et al. | |
| 5,928,664 A | 7/1999 | Yang et al. | |
| 6,248,363 B1 * | 6/2001 | Patel | A61K 31/568 424/497 |
| 6,783,790 B1 | 8/2004 | Emsing et al. | |
| 6,827,955 B2 | 12/2004 | McCabe | |
| 2002/0197357 A1 | 12/2002 | Pfeiffer | |
| 2005/0171034 A1 | 8/2005 | Halevie-Goldman | |
| 2005/0226990 A1 | 10/2005 | Pellecer | |
| 2006/0039967 A1 * | 2/2006 | Ohta | A61K 31/198 424/464 |

(Continued)

FOREIGN PATENT DOCUMENTS

| | | |
|---|---|---|
| CN | 102422960 B | 2/2013 |
| CN | 102511603 B | 5/2013 |

(Continued)

OTHER PUBLICATIONS

Jeewanthi et al. "Improved Functional Characteristics of Whey Protein Hydrolysates in Food Industry". Korean J. Food Sci. An. vol. 35, No. 3, pp. 350-359. 2015. (Year: 2015).*

(Continued)

*Primary Examiner* — Jenna A Watts
(74) *Attorney, Agent, or Firm* — William Thomas Babbitt, Esq.; Leech Tishman Fuscaldo & Lampl

(57) ABSTRACT

A gummy composition including: 10 to 45 percent by weight of the composition of a protein, wherein a portion of the protein is hydrolyzed; Maltitol syrup; sugar; a structurant; and Water. A method of manufacture of a gummy composition including: Forming a mixture comprising 10 to 45 percent by weight of the composition of a protein, maltitol syrup, sugar, a structurant and water, wherein a portion of the protein is hydrolyzed; and cooking the mixture at a temperature of 85° C. or less.

27 Claims, 2 Drawing Sheets

(56) References Cited

U.S. PATENT DOCUMENTS

| | | |
|---|---|---|
| 2007/0190130 A1* | 8/2007 | Mark ............... A61K 47/42 424/451 |
| 2007/0196496 A1* | 8/2007 | Farber ............ A61K 31/718 424/488 |
| 2008/0241319 A1* | 10/2008 | Pandey ............ A23G 3/2007 426/72 |
| 2009/0226548 A1 | 9/2009 | Minatelli et al. |
| 2009/0239826 A1 | 9/2009 | Halevie-Goldman |
| 2009/0274791 A1 | 11/2009 | Mattson et al. |
| 2010/0151108 A1 | 6/2010 | Gorris |
| 2010/0178413 A1 | 7/2010 | Gorris |
| 2010/0330058 A1 | 12/2010 | Davis |
| 2011/0044964 A1 | 2/2011 | Davis |
| 2011/0064706 A1 | 3/2011 | Minatelli et al. |
| 2011/0071119 A1 | 3/2011 | Davis |
| 2012/0015075 A1 | 1/2012 | Davis |
| 2012/0141614 A1 | 6/2012 | Gierhart et al. |
| 2012/0164134 A1 | 6/2012 | Davis |
| 2012/0261567 A1 | 10/2012 | Voorhees et al. |
| 2012/0282204 A1 | 11/2012 | Gierhart et al. |
| 2012/0302645 A1 | 11/2012 | Liu et al. |
| 2013/0045313 A1 | 2/2013 | Steele et al. |
| 2013/0059920 A1 | 3/2013 | Friedel et al. |
| 2013/0108762 A1 | 5/2013 | Mo |
| 2013/0267608 A1 | 10/2013 | Subramanian et al. |
| 2013/0267808 A1 | 10/2013 | Brister et al. |
| 2015/0216199 A1* | 8/2015 | Porter ............... A23G 3/42 426/72 |
| 2016/0015777 A1 | 1/2016 | Traylor |
| 2016/0073668 A1 | 3/2016 | Gilmer et al. |
| 2016/0279058 A1 | 9/2016 | Rodriguez et al. |
| 2019/0289872 A1 | 9/2019 | Syed |

FOREIGN PATENT DOCUMENTS

| | | |
|---|---|---|
| CN | 102550774 B | 6/2013 |
| CN | 108112762 A | 6/2018 |
| CN | 110250310 A | 9/2019 |
| JP | 2010130935 A | 6/2010 |
| JP | 20100130935 A | 6/2010 |
| WO | 2011/034644 A | 6/2010 |
| WO | WO2011/034644 A1 | 3/2011 |

OTHER PUBLICATIONS

Shaziya's Recipes: "Homemade Gummy candy/jujubes candy recipe". Available online as of Sep. 28, 2016 from http://shaziyasrecipes.blogspot.com. pp. 1-11. (Year: 2016).*

Hegenbart. "New Analytical Technologies Come of Age", available online as of Oct. 1995 from https://www.naturalproductinsider.com. pp. 1-68. (Year: 1995).*

\* cited by examiner

PROTEIN GUMMY COMPOSITION

FIELD

Nutritional products and methods related thereto

BACKGROUND

Chewable gummy products generally made of a gelatin or pectin matrix with sugar, glucose or corn syrup, flavoring, coloring and citric acid have been a popular snack food product. The product typically has a gel or gel-like structure and texture with a length on the order of two centimeters and is produced in a variety of shapes, colors and flavors that are chewable when consumed. Recently, gummy products have been supplemented with vitamins, minerals and/or fiber. Protein and vitamin gummy formulas have also been developed as a high protein source. Issues associated with protein and vitamin gummies generally include their color stability, vitamin stability, texture and flavor.

DETAILED DESCRIPTION

Figure 1:
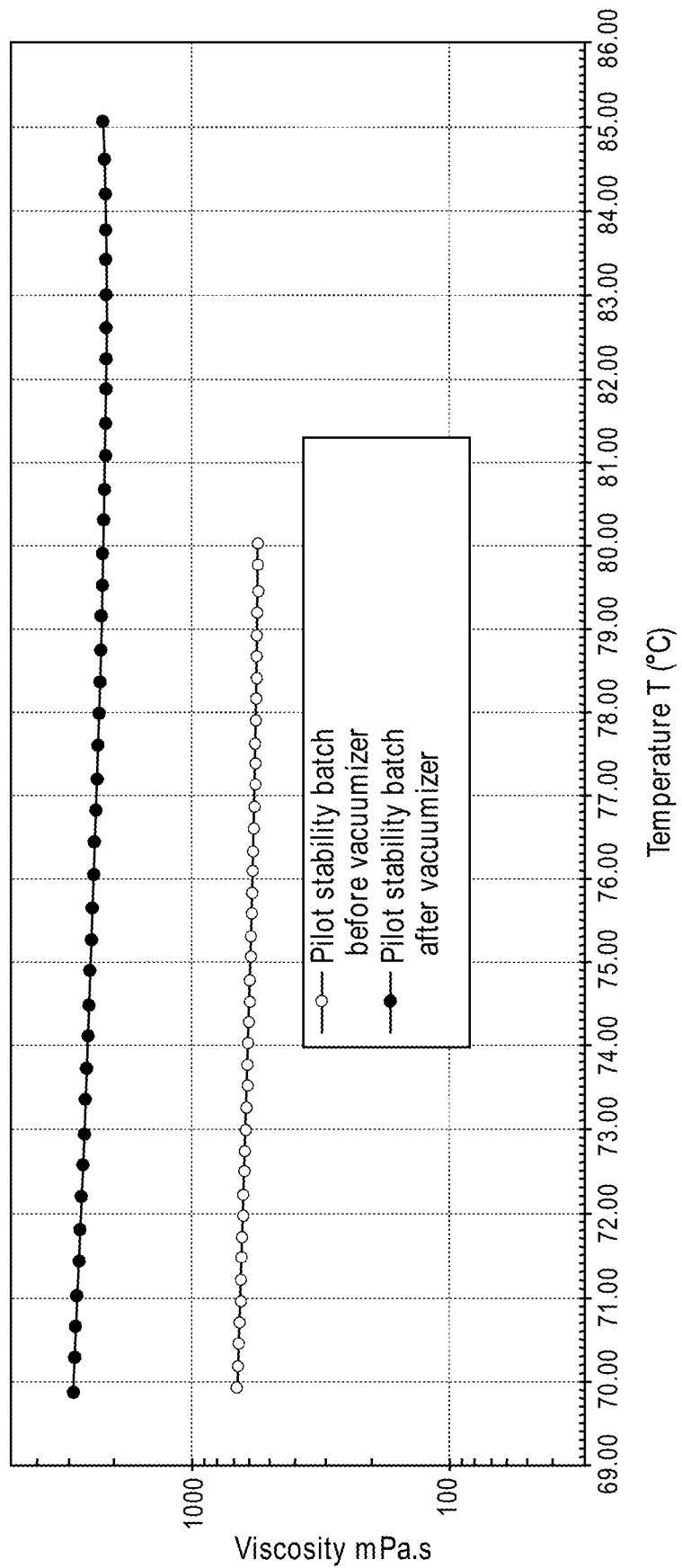
FIG. 1 shows a temperature dependence on viscosity of a protein and vitamin B12 gummy composition (slurry) after mixing (bottom curve) and after vacuumizer (top curve).

A chewable gummy or gum composition for oral consumption including an amount of protein is disclosed. In one embodiment, the gummy or gum composition includes 10 to 45 percent by weight of the composition of a protein, wherein a portion of the protein is hydrolyzed; a sugar alcohol such as maltitol syrup; sugar; a structurant such as gelatin, pectin, agar-agar, locust beam gum or a combination of structurants; and water. The gummy or gum composition may also include a vitamin or vitamins such as a single vitamin (e.g., vitamin B12) or multiple vitamins (e.g., vitamin B2, vitamin D3, vitamin E, vitamin B3, vitamin B6, vitamin B12, biotin, iodine, folic acid and ascorbic acid (vitamin C)) or one or more minerals (e.g. iron, calcium) or one or more other supplements (e.g., phytosterols, fish oil, or other omega-3 fatty acids) or a combination of vitamin, minerals, and/or other supplements. Using a sugar alcohol such as maltitol syrup having minimum reducing sugar effect (e.g., less than 0.5%), using a protein or combinations of proteins that are partially hydrolyzed has been shown to reduce a discoloration (e.g., browning) of the gummy composition during processing and during stability testing. Including a sucrose ester with, for example, a hydrophilic-lipophilic balance (HLB) of 14 or higher in a representative amount of 0.05 to 0.2 percent by weight with a defoamer having a low peroxide value (e.g., less than 3 mEq/Kg fat) also aids in the reduction of discoloration.

In one embodiment, a gummy composition includes 10 to 45 percent by weight of a protein such as whey protein or other protein or combination of similar or different proteins wherein a portion of the protein is hydrolyzed; 25 to 35 percent by weight of a maltitol syrup; 13 to 19 percent by weight sugar (e.g., sucrose); 4 to 5 percent by weight of a structurant; and 14 to 20 percent by weight deionized water. In another embodiment, the composition also includes 0.05 to 0.2 percent by weight of a sucrose ester, 0.05 to 0.3 percent by weight of a hydrophilic defoamer such as polyglyceryl-10 caprylate/caprate (commercially available from Lonza and abbreviated POLYADO® 10-1-CC) or lauroyl polyexyl-32 gycerides (GELUCIRE® 44/14 commercially available from Gattefossé of Paramus, N.J.). Other ingredients representatively include one or more vitamins, minerals, other supplements; one or more organic acids (e.g., citric acid, malic acid); glycerin; a colorant; a flavorant; and a bitter masking agent. The described compositions provide a gummy or gum composition having good taste, high protein content, stable vitamin and/or mineral content, supplement protein, gummy or gum formulation (composition) that can be made with processing temperatures at less than 85° C., such as in the range of 60° C. to 78° C. The gummy or gum composition is produced in a size that can be orally consumed (oral administration) such as by taking through the mouth and chewed or crushed and ground by teeth.

The combination of a partially hydrolyzed protein (e.g., partially hydrolyzed whey protein) such as more than one protein each with different degrees of hydrolysis (DH) increases protein solubility and concentration in a gummy matrix and reduces bitterness. A hydrophilic defoamer such as POLYADO® 10-1-CC (HLB=14) or lauroyl polyexyl-32 glycerides (HLB=14) has a property to reduce foaming of the composition without a reduction in stability of vitamin and/or mineral supplements in the matrix. Maltitol syrup in the gummy matrix has a property to reduce a discoloration of the protein relative to a matrix that might instead use corn syrup or high maltose corn syrup. A sugar concentration is optimized to achieve an elastic texture and rapid setting of the gummy matrix. A sucrose ester (HLB=15 to 16) in the gummy matrix has a property to improve a texture of the gummy or gum composition (provides a smooth texture with reduced or minimal or no chalkiness) and also protects the protein present from heat degradation during processing. The result is a gummy or gum composition having a relatively high concentration of protein (e.g., 10 to 45% by weight) with a pleasant taste and texture; a stable vitamin, mineral and/or other supplement when combined with a protein in a gummy composition; minimized maillard discoloration; and an improved elastic texture.

In one embodiment, a gummy composition includes 10 percent to 40 percent by weight of a protein wherein a portion of the protein may be hydrolyzed. In another embodiment, the weight percent of protein is 15 percent to 30 percent and in a further embodiment 20 percent to 30 percent. The amount of protein may be a single protein that may or may not be hydrolyzed and, if hydrolyzed, the protein is 5 percent to 30 percent hydrolyzed. In another embodiment the amount of protein includes a first protein that is hydrolyzed (e.g., 5 percent to 30 percent hydrolyzed) and a second protein that may or may not be hydrolyzed (e.g., 5 percent to 10 percent hydrolyzed). A representative ratio of a weight percent of the first protein to a weight percent of the second protein ranges from 0.45 to 3.5, in another embodiment 1.05 to 3.5 and in another embodiment 1.05 to 2.2. In one embodiment, the first protein has a degree of hydrolysis of 20 to 30 percent and a second protein that is not hydrolyzed or has a degree of hydrolysis of up to 10 percent. The degree of hydrolysis is generally related to water solubility with the higher degree of hydrolysis the more soluble the protein is in water. One suitable protein for the first hydrolyzed protein is a whey hydrolysate protein. An example of a commercially available whey hydrolysate protein is LACPRODAN® HYDRO365 commercially available from Arla Foods Ingredients of Denmark. LACPRODAN® HYDRO365 has a degree of hydrolysis on the order of 23 to 29 percent. In one embodiment, the first protein is combined with a second protein that has a lower degree of hydrolysis or is not hydrolyzed. An example of a suitable protein for the second protein is BEVWISE I-300W, commercially available from Glanbia Nutritionals of Fitchburb, Wis., which is not hydrolyzed. In another embodiment, the protein includes two or more proteins that each have some degree of hydrolysis. In one embodiment, the protein amount in a gummy composition includes a first protein and a second protein wherein each of the first and second protein are a whey protein with a degree of hydrolysis. The first protein is a whey hydrolysate protein having a degree of hydrolysis of less than 10 percent. An example of such a whey hydrolysate protein includes LACPRODAN® HYDRO.clear, also commercially from Arla Foods Ingredients that has a degree of hydrolysis on the order of seven percent. In one embodiment, the second protein is whey hydrolysate protein THERMAX® 690 commercially available from Glanbia Nutritionals of Fitchburg, Wis. that has a degree of hydrolysis on the order of 10 to 12 percent. In addition to whey proteins, other proteins are also suitable. Examples include but are not limited to, casein protein, egg protein, plant protein, pea protein, brown rice protein, milk protein or combinations of different protein sources.

In one embodiment, a gummy or gum composition includes an amount of a protein, maltitol syrup, sugar, a structurant, a sucrose ester, a hydrophilic defoamer, and a sucrose ester. Representatively, to manufacture a gummy or gum composition, a sucrose ester premix is formed by adding an amount of the sucrose ester (e.g., SISTERNA® PS 750 (sucrose palmitate/stearate)) into warm water while mixing, and then heating the premix to a temperature of 80° C. A defoamer premix is also prepared by adding a defoamer (e.g., POLYALDO® 10-1-CC or lauroyl polyexyl-32 glycerides) into glycerin while mixing and then heating the premix to 75° C. Where the composition includes a first protein that is a hydrolyzed protein and a second protein that is not hydrolyzed or hydrolyzed to a lesser extent, the amount of the second protein may be combined with sugar as a third premix to aid in the blending of the second protein into the gummy matrix. To form a gummy composition or matrix, a gelatin such as 250 bloom gelatin (20 mesh) is added to an amount of water at 80° C. to 90° C. in a tank. The maltitol corn syrup is added and the temperature lowered to 75° C. Next, the first protein (e.g., hydrolyzed whey protein) is added and mixed well until it dissolves with a temperature kept below 72° C. This is followed by the addition of the sucrose ester premix and then slowly adding one-half the second protein/sugar premix with continuous mixing. The defoamer premix is then added with continued mixing followed by the addition of the remainder of the second protein/sugar premix. The entire composition is continually mixed until the mixture is uniform at a temperature below 75° C. Then the entire composition is de-aired. A premix of one or more vitamins, one or more minerals and/or one or more nutritional supplements, color, flavor and acid solution as necessary or desired are added afterwards to form the final composition.

Example 1: Protein and Vitamin B 12 Formulation

Table 1 presents a formulation for an embodiment of gummy or gum composition including protein and vitamin B12.

TABLE 1

| | Ingredient Compostion Ingredient | Function | Before Depositing wt % |
|---|---|---|---|
| 1 | DI water | Carrier | 14.663% |
| 2 | Sugar | Carrier, provide sweetness | 18.001% |
| 3 | Maltidex Maltitol Syr 5275 | Carrier | 32.063% |
| 4 | 250 Bloom Gelatin 20mesh | Structurant | 4.231% |
| 5 | Whey Protein HY hydro clear | Protein | 17.452% |
| 6 | Hydrolyzed whey protein isolate/Thermax 690 | Protein | 5.884% |
| 7 | Glycerin | Carrier | 4.980% |
| 8 | POLYALDO ®10-1-CC | Defoamer | 0.125% |
| 9 | Sucralose | Sweetener | 0.038% |
| 10 | Vitamin B12 (1% on mannitol) | Vitamin | 0.682% |
| 11 | Citric Acid | Acid | 0.657% |
| 12 | Nature Color | Color | 0.194% |
| 13 | Mixed Berry | Flavor | 0.300% |
| 14 | Sucrose Ester PS 750 | Texture enhancer | 0.093% |
| 15 | Malic Acid | Acid | 0.537% |
| 16 | Bitter Masking Agent | Bitter Masking | 0.100% |
| | Sum: | | 100% |

Example 2: Protein and Vitamin C Gummy Composition

Table 2 presents four protein and vitamin C gummy pilot batch composition formulas, their respective appearance and physical properties at each step of a pilot batch process. Maltitol syrup 5275 (reducing sugar <0.2%) was used in all these four pilot formulas. Defoamer Polyglyceryl-10 Caprylate/Caprate (HLB=14) was used except for pilot batch 1504-18-10, which used Lauroyl polyoxyl-32 glycerides (HLB=14), trade name GELUCIRE® 44/14. In each batch process, gelatin was first hydrated in the DI water at 80° C. then maltitol syrup was added. Sucrose ester was separately dissolved in water and then added. The batch temperature at this point was kept below 75° C. before adding a first whey protein hydrolysate (e.g., Lacprodan Hydro 365). After the first whey protein hydrolysate dissolved in the mixture, the preblend second whey protein and sugar were added; the defoamer was initially dissolved in glycerin and the defoamer/glycerin mixture was added when defoaming was needed. The mixture was then pumped directly to a vacuumizer (without needing a high pressure and temperature step to dissolve the gelatin) and defoamed at vacuumizer to remove further air bubbles intruded during the mixing step. Vitamin C premix, color, flavor, bitter masking flavor, sucralose and acid solution were added and mixed before the finish gummy slurry was transferred into mogul hopper and deposited in the starch trays. The gummies were dried in the drying chamber for about 24 hours before removing starch and wax coated.

Referring to Table 2, with maltitol syrup, pilot batches 1504-18-07 and 1504-18-11 showed a light beige color after mixing and remained light beige in the vacuumizer after further defoaming. The ratio of whey protein hydrolysate Hydro365 to whey protein isolate (from 1.06 to 2.15) did not affect the slurry appearance. Compared with 1504-18-11, 1504-18-12 has higher sugar concentration, 19.217% vs. 17.054% and lower maltitol syrup concentration, 23.903% vs. 25.789%. 1504-18-12 pilot batch showed a light brown color after mixing and remained light brown in the vacuumizer. Higher sugar and lower maltitol syrup concentration increase the solid content and the probability that sucrose will react with amino acid groups in the protein under acidic conditions and relatively high temperature. Without wishing to be bound by theory, increasing a reducing sugar concentration increases the probability of a reducing sugar reaction with the whey protein to increase browning. In 1504-18-10, Lauroyl polyoxyl-32 glycerides defoamed the gummy slurry at 0.15%. The gummy base slurry appeared light brown in the vacuumizer with 0.1% sucrose ester.

reduces from 2900 to 2200 cps. Vitamin B12 premix, color, flavor, bitter masking flavor, sucralose and acid solution were added and mixed before the finished gummy slurry was transferred into mogul hopper and deposited in starch trays. The gummy compositions were dried in the drying chamber for about 24 hours before removing starch and wax coating. The gummy samples were set up for stability studies.

TABLE 2

Protein and Vitamin C Gummy Compositions

| Maltitol based | | Pilot batch Lot # Ingredients | 1504-18-07 wt % | 1504-18-10 wt % | 1504-18-11 wt % | 1504-18-12 wt % |
|---|---|---|---|---|---|---|
| | 1 | DI water | 18.931% | 18.007% | 16.744% | 16.256% |
| | 2 | Sugar | 14.640% | 14.791% | 17.054% | 19.217% |
| | 3 | Maltitol SYR 5275 | 26.709% | 26.982% | 25.789% | 23.903% |
| | 4 | 250 Bloom Gelatin | 4.174% | 4.217% | 4.232% | 4.259% |
| | 5 | Whey Protein Hydrolysate/ Lacprodan Hydro365 | 18.291% | 18.478% | 14.021% | 14.111% |
| | 6 | Whey Protein Isolate/BevWise I-300W | 8.507% | 8.594% | 13.192% | 13.277% |
| | 7 | Glycerin | 3.561% | 3.598% | 3.620% | 3.643% |
| | 8 | Polyaldo 10-1-CC | 0.119% | | 0.120% | 0.120% |
| | 9 | Gelucire 44/14 | | 0.150% | | |
| | 10 | Sucrose ester SP750 | 0.148% | 0.100% | 0.145% | 0.146% |
| | 11 | Sucralose | 0.099% | 0.100% | 0.100% | 0.075% |
| | 12 | Ascorbic acid | 0.890% | 0.864% | 0.864% | 0.864% |
| | 13 | Sodium ascorbate | 1.013% | 1.066% | 1.066% | 1.066% |
| | 14 | Citric acid | 1.820% | 1.966% | 1.966% | 1.966% |
| | 15 | Quetsch WS | 0.356% | 0.337% | 0.337% | 0.297% |
| | 16 | Bitter masking flavor | 0.742% | 0.750% | 0.750% | 0.800% |
| | | Sum: | 100.000% | 100.000% | 100.000% | 100.000% |
| Slurry after mixing | | Appearance | light beige | beige | light beige | light Brown |
| | | Density | 1.16 | 1.256 | 1.158 | 1.20 |
| | | pH | n/a | 5.67 | 5.5 | 5.42 |
| | | Brix | 74 | 73 | 75 | 76 |
| Slurry in vacuumizer | | Appearance | light beige | light brown | light beige | light Brown |
| | | Density | 1.328 | 1.293 | 1.29 | 1.33 |
| | | pH | 5.62 | 5.66 | 5.5 | 5.52 |
| | | Brix | 76 | 75 | 75.5 | 76 |
| Slurry before deposit | | Density | 1.289 | 1.256 | 1.285 | 1.31 |
| | | pH | 4.52 | 4.49 | 4.22 | 4.21 |
| | | Brix | 77 | 75 | 75.5 | 76 |
| Dried gummy | | Water activity | 0.743 | 0.749 | 0.759 | 0.738 |
| | | Brix | 79.00 | 79 | 77.2 | 78.6 |

Example 3. Protein and Vitamin B12 Gummy Composition

Table 3 presents two protein and vitamin B12 gummy composition formulas that were made using whey protein hydrolysate HYDRO.clear with a lower degree of hydrolysis (7 percent) than HYDRO365 (23-29 percent) and whey protein hydrolysate THERMAX® 690 (10-12 percent hydrolysis). In this embodiment, the whey protein hydrolysate HYDRO.clear is present in an amount greater than an amount of whey protein hydrolysate THERMAX® 690. The pilot batch slurry appeared beige after mixing and kept beige in the vacuumizer. The viscosity of the slurry samples after mixing and after removing air bubbles in the vacuumizer were measured with a rheometer, as shown in FIG. 1. Viscosity of both slurries decreases with increasing temperature. From 70° C. to 80° C., a viscosity of the slurry after mixing reduces from 671 to 555 centipoise (cps); a viscosity of slurry after removing air bubbles in the vacuumizer

TABLE 3

Protein & Vitamin B12 Gummy Compositions

| | Protein & B12 gummy improved Stability batches | Function | 1512-09-00 Mixed berry Wt % | 1512-09-01 Strawberry Wt % |
|---|---|---|---|---|
| | Ingredients | | | |
| 1 | DI water | Carrier | 14.828% | 14.877% |
| 2 | Sugar | Solid carrier | 18.076% | 18.086% |
| 3 | Maltidex Maltitol Syr 5275 | Carrier | 32.261% | 32.277% |
| 4 | 250 Bloom Gelatin 20 mesh | Structrant | 4.217% | 4.219% |
| 5 | Whey Protein HY Hydro Clear | Protein | 17.409% | 17.418% |
| 6 | Hydrolyzed whey protein isolate/Thermax 690 | Protein | 5.537% | 5.540% |
| 7 | Glycerin | Carrier | 4.949% | 4.952% |
| 8 | Polyaldo 10-1-CC | Defoamer | 0.125% | 0.125% |
| 9 | Vitamin B12 (1% on mannitol) | Vitamin | 0.682% | 0.682% |

TABLE 3-continued

Protein & Vitamin B12 Gummy Compositions

| Protein & B12 gummy improved Stability batches | Function | 1512-09-00 Mixed berry Wt % | 1512-09-01 Strawberry Wt % |
|---|---|---|---|
| 10 Natural color/*Fragaria* 100 WS | Color | | 0.060% |
| 11 Nature Color/Quetsch WS | Color | 0.191% | |
| 12 Sucrose ester PS 750 | Protect protein from heat | 0.093% | 0.093% |
| 13 Sucralose | Sweetener | 0.038% | 0.031% |
| 14 Natrual strawberry #603264 | Flavor | | 0.250% |
| 15 Mixed Berry JQ73 | Flavor | | 0.300% |
| 16 Citric acid, anhydrous | Acid | 0.657% | 0.710% |
| 17 Malic Acid | Acid | 0.537% | 0.5800% |
| 18 Bitter masking powder | Bitter masking flavor | 0.100% | 0.100% |
| | | 100.000% | 100.000% |

The protein and vitamin B12 gummy composition show good color stability at 25° C./60% relative humidity (RH) for 6 months and at 30° C./65% RH for 4.5 months. Table 4 lists the vitamin B12 assay test results in gummy compositions stored at 30° C./65% RH for 0, 1, 2, 3, 4, 4.5 months. As illustrated, the vitamin B12 content remained stable from 1 month to 4.5 month.

TABLE 4

Vitamin B12 Assay Results in Protein & Vitamin B12 Gummy Compositions stored at 30° C./65% RH for 0-4.5 Months

| Assay/Test | 0 month | 1 month | 2 months | 3 months | 4 months | 4.5 months |
|---|---|---|---|---|---|---|
| Vit-B12 (mcg) | 418 | 379 | 379 | 369.5 | 399 | 360.5 |

The sugar profile of the protein and vitamin B12 gummy compositions after stability studies at 0-6 months also remained stable. Shown in both Table 5 and Table 6, only fructose increases with time and the other sugar types are quite stable with time.

TABLE 5

Sugar Profile of Protein & Vitamin B12 Gummy Compositions stored at 25° C./60% RH for 0-6 months

| | Month | | | | | |
|---|---|---|---|---|---|---|
| | 0 | 1 | 2 | 3 | 4 | 6 |
| Fructose | 0.2% | 0.4% | 0.6% | 0.6% | 0.9% | 0.6% |
| Glucose | 0.6% | 0.6% | 0.6% | 0.6% | 0.8% | 0.4% |
| Sucrose | 18.7% | 18.9% | 18.9% | 19.3% | 18.0% | 20.1% |
| Lactose | 0.1% | 0.1% | 0.1% | 0.1% | 0.1% | 0.1% |
| Maltose | 0.1% | 0.1% | 0.1% | 0.1% | 0.1% | 0.1% |
| Galactose | 0.1% | 0.1% | 0.1% | 0.1% | 0.1% | 0.1% |

TABLE 6

Sugar Profile of Protein & Vitamin B12 Gummy Compositions stored at 30° C./60% RH for 0-6 Months

| | Month | | | | |
|---|---|---|---|---|---|
| | 0 | 1 | 2 | 3 | 6 |
| Fructose | 0.2% | 0.4% | 0.8% | 0.7% | 1.0% |
| Glucose | 0.6% | 0.6% | 0.6% | 0.6% | 0.6% |
| Sucrose | 18.7% | 18.6% | 18.7% | 19.7% | 18.7% |
| Lactose | 0.1% | 0.1% | 0.1% | 0.1% | 0.1% |
| Maltose | 0.1% | 0.1% | 0.1% | 0.1% | 0.1% |
| Galactose | 0.1% | 0.1% | 0.1% | 0.1% | 0.1% |

Example 4. Protein and Multivitamin Gummy Composition

Protein and multivitamin gummy composition formulas were prepared using the same base formula and process as the protein and vitamin B12 gummy compositions described in Example 3. The formulas are presented in Table 7.

TABLE 7

Protein and Multi Gummy Compositions

| Protein & Multi gummy batches | Function | 1512-08-00 Strawberry Wt % | 1512-08-01 Orange Wt % |
|---|---|---|---|
| 1 DI water | Carrier | 15.254% | 15.210% |
| 2 Sugar | Structrant | 18.251% | 18.276% |
| 3 Maltidex Maltitol Syr 5275 | Carrier | 30.720% | 30.762% |
| 4 250 Bloom Gelatin 20 mesh | Carrier | 4.258% | 4.264% |
| 5 Whey Protein HY hydro clear | Protein | 17.577% | 17.601% |
| 6 Hydrolyzed whey protein isolate/Thermax 690 | Protein | 5.591% | 5.598% |
| 7 Glycerin | Carrier | 4.997% | 5.004% |
| 8 Polyaldo 10-1-CC | Defoamer | 0.126% | 0.126% |
| 9 Sodium ascorbate | Vitamin C | 0.497% | 0.497% |
| 10 Multi Powders Premix | Vitamin | 1.079% | 1.079% |
| 11 Sucrose ester PS 750 | Protect protein from heat | 0.094% | 0.094% |
| 12 Natural Color/Red Strawberry *Fragaria* 100 WS | Color | 0.060% | |
| 13 Nature Color/ColorFruit Orange 205 WSS | Color | | 0.245% |
| 14 Sucralose | Sweetener | 0.031% | 0.039% |
| 15 Strawberry Flavor #603264 | Flavor | 0.260% | |
| 16 Orange Flavor PB10 | Flavor | | 0.120% |
| 17 Citric acid, anhydrous | Acid | 1.080% | 0.960% |
| 18 Bitter masking powder | Bitter masking flavor | 0.125% | 0.125% |
| | | 100.000% | 100.000% |

Figure 2:
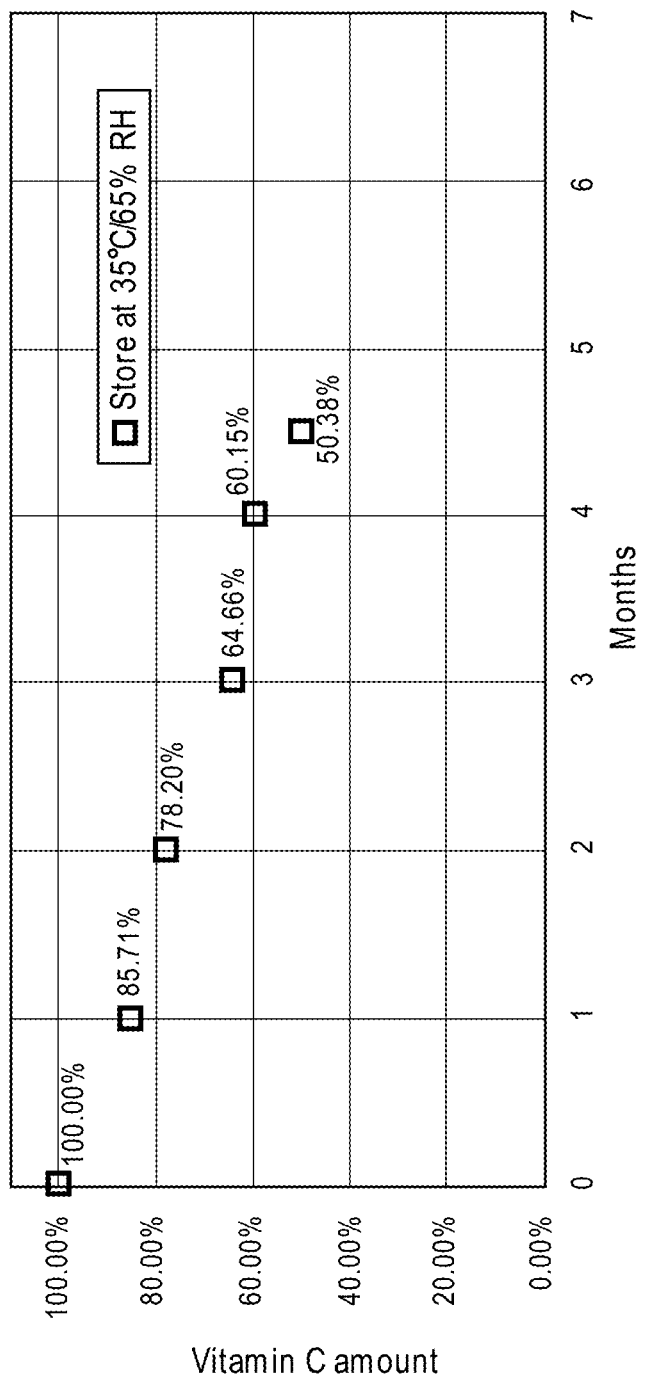
FIG. 2 shows a graph of a vitamin C amount in protein and multivitamin gummy compositions after storing at 30° C./65% RH for 1-4.5 months compared with a vitamin C amount at 0 months.

The protein and multivitamin gummy compositions showed good color stability at 25° C./60% RH for six months and at 30° C./65% RH for four months. Table 8 lists the vitamin activity test results after the protein and multivitamin gummy compositions were stored at 30° C./65% RH chamber for 0, 1, 2, 3, 4, 4.5, months. Vitamin D3, E, B3, B6, B12, Biotin and Iodine kept stable. Folic acid and ascorbic acid (Vit C) tended to reduce with time. However, compared with protein and vitamin gummy compositions that used corn syrup, the reduction rate of vitamin C in this study is much slower as illustrated in FIG. 2.

TABLE 8

Chemical Test Results of Protein and Multi Gummy Compositions stored at 30° C./65% RH for 0-4.5 Months

| | Assay/Test | 0 month | 1 month | 2 month | 3 month | 4 month | 4.5 month |
|---|---|---|---|---|---|---|---|
| 1 | Vitamin D3 (IU) | 840.7 | 854 | 755 | 763.5 | 856 | 859 |
| 2 | Vitamin E (d-alpha Tocopheryl Acetate) (IU) | 10.3 | 10.5 | 9.67 | 10 | 9.98 | 10.3 |
| 3 | B3 Niacinamide (mg) | 7.17 | 7.04 | 7.14 | 7 | 7.06 | 7.02 |
| 4 | B6 Pyridoxine HCl (mg) | 0.63 | 0.64 | 0.65 | 0.64 | 0.63 | 0.63 |
| 5 | B12 Cyanocobalamin (mcg) | 2.19 | 2.47 | 2.30 | 2.31 | 2.11 | 2.31 |
| 6 | Folic Acid | 224 | 195 | 225 | 193 | 191 | 184 |
| 7 | Biotin (mcg) | 64.9 | 66.2 | 68.5 | 61.3 | 59.6 | 69.4 |
| 8 | Iodine (mcg) | 55.2 | 55.1 | 55.2 | 56.4 | 52.6 | 53.2 |
| 9 | Ascorbic Acid (mg) | 26.6 | 22.8 | 20.8 | 17.2 | 16 | 13.4 |

The sugar profile of the protein and multivitamin gummy compositions after stability studies at 0-4.5 month is stable. Shown in Table 9 at 25° C./60% RH for 0-4.5 month, the sugar profile of samples remained relatively stable. Shown in Table 10, at 30° C./65% RH for 0-4.5 month, only fructose increases slightly and glucose decreases slightly with time and the other sugar types are quite stable with time.

TABLE 9

Sugar profile of Protein and Multi gummy stored at 25° C./60% RH for 0 to 4.5 months

| | Month | | | | | |
|---|---|---|---|---|---|---|
| | 0 | 1 | 2 | 3 | 4 | 4.5 |
| Fructose | 0.36% | 0.36% | 0.54% | 0.36% | 0.36% | 0.36% |
| Glucose | 0.54% | 0.55% | 0.54% | 0.36% | 0.36% | 0.36% |
| Sucrose | 19.26% | 19.11% | 19.41% | 19.60% | 19.22% | 19.22% |
| Lactose | 0.11% | 0.09% | 0.11% | 0.11% | 0.11% | 0.11% |
| Maltose | 0.11% | 0.09% | 0.11% | 0.11% | 0.11% | 0.11% |
| Galactose | 0.11% | 0.09% | 0.11% | 0.11% | 0.11% | 0.11% |

TABLE 10

Sugar profile of Protein & Multi gummy stored at 30 C./65% RH for 0 to 4.5 months

| | Month | | | | | |
|---|---|---|---|---|---|---|
| | 0 | 1 | 2 | 3 | 4 | 4.5 |
| Fructose | 0.36% | 0.36% | 0.54% | 0.55% | 0.54% | 0.54% |
| Glucose | 0.54% | 0.54% | 0.36% | 0.37% | 0.36% | 0.36% |
| Sucrose | 19.26% | 19.41% | 19.55% | 20.81% | 18.68% | 18.68% |
| Lactose | 0.11% | 0.11% | 0.11% | 0.09% | 0.11% | 0.11% |
| Maltose | 0.11% | 0.11% | 0.11% | 0.09% | 0.11% | 0.11% |
| Galactose | 0.11% | 0.11% | 0.11% | 0.09% | 0.11% | 0.11% |

The preceding paragraphs describe a protein gummy or gum composition that through a combination of carefully selected constituents (e.g., protein combination, sugar concentration, sugar alcohol (e.g., maltitol syrup), defoamer, sucrose ester) has a stable, desirable color with minimal maillard discoloration both in processing and over time (shelf life) and may be produced at relatively low processing temperatures. In addition to achieving a stable, relatively high protein content, the composition may also include one or more vitamins, minerals or other supplements that also remain relatively stable in the composition over time.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

The invention claimed is:

1. A gummy composition comprising:
   10 to 45 percent by weight of the composition of a protein, wherein a portion of the protein is hydrolyzed;
   greater than 20 percent by weight maltitol syrup;
   sucrose present in an amount of 19 percent by weight or less;
   a structurant;
   a sucrose ester having a hydrophilic-lipophilic balance of 14 or higher; and
   water.

2. The gummy composition of claim 1, wherein the sucrose ester is present in an amount of 0.05 percent to 0.2 percent by weight.

3. The gummy composition of claim 1, further comprising a hydrophilic defoamer.

4. The gummy composition of claim 3, wherein the defoamer comprises polyglyceryl-10 caprylate/caprate or lauroyl polyexyl-32 glycerides.

5. The gummy composition of claim 1, wherein the protein is present in an amount of 20 percent to 30 percent by weight and comprises a first protein that is a whey protein hydrolysate and a second protein that is a whey protein hydrolysate or a whey protein that is not hydrolyzed.

6. The gummy composition of claim 5, wherein the second protein is a whey protein hydrolysate and the first protein has a greater degree of hydrolysis than the second protein.

7. The gummy composition of claim 5, wherein a ratio of a weight percent of the first protein to a weight percent of the second protein ranges from 0.45 to 3.5.

8. The gummy composition of claim 1, wherein the protein comprises a first protein that is a whey protein hydrolysate and a second protein that is a whey protein hydrolysate and the second protein has a greater degree of hydrolysis than the first protein, and an amount of the first protein in the composition is greater than an amount of the second protein.

9. The gummy composition of claim 1, wherein the maltitol syrup is present in an amount of 25 percent to 35 percent by weight.

10. The gummy composition of claim 1, further comprising at least one nutritional supplement.

11. The gummy composition of claim 10, wherein the at least one nutritional supplement comprises a vitamin supplement.

12. The gummy composition of claim 11, wherein the at least one nutritional supplement comprises a vitamin B supplement.

13. The gummy composition of claim 10, wherein the at least one nutritional supplement comprises multiple vitamin supplements or multiple vitamin and mineral supplements.

14. The composition of claim 1, further comprising glycerin.

15. The composition of claim 5, wherein a ratio of a weight percent of the first protein to a weight percent of the second protein is 1 to 3.5.

16. The composition of claim 1, wherein the structurant is present in an amount of 4 percent by weight to 5 percent by weight.

17. A gummy composition comprising:
10 to 45 percent by weight of the composition of a protein, wherein a portion of the protein is hydrolyzed;
greater than 20 percent by weight maltitol syrup;
sucrose present in an amount of up to 19 percent by weight;
a structurant;
a sucrose ester having a hydrophilic-lipophilic balance of 14 or higher;
a hydrophilic defoamer; and
water.

18. The gummy composition of claim 17, wherein the maltitol syrup is present in an amount of 25 percent to 35 percent by weight.

19. The gummy composition of claim 17, further comprising at least one nutritional supplement.

20. The gummy composition of claim 19, wherein the at least one nutritional supplement comprises a vitamin supplement.

21. The gummy composition of claim 19, wherein the at least one nutritional supplement comprises a vitamin B supplement.

22. The gummy composition of claim 19, wherein the at least one nutritional supplement comprises multiple vitamin supplements or multiple vitamin and mineral supplements.

23. The gummy composition of claim 17, wherein the sucrose ester is present in an amount of 0.05 percent to 0.2 percent by weight.

24. The gummy composition of claim 17, wherein the protein is present in an amount of 20 percent to 30 percent by weight.

25. The gummy composition of claim 17, wherein the protein comprises a first protein that is a whey protein hydrolysate and a second protein that is a whey protein hydrolysate or a whey protein that is not hydrolyzed.

26. The gummy composition of claim 25, wherein the second protein is a whey protein hydrolysate and the first protein has a greater degree of hydrolysis than the second protein.

27. The gummy composition of claim 25, wherein a ratio of a weight percent of the first protein to a weight percent of the second protein ranges from 1 to 3.5.

* * * * *